United States Patent [19]

Rosati

[11] 3,928,324

[45] Dec. 23, 1975

[54] MALONYL DERIVATIVES OF 6-(α-AMINOACYLAMIDO)PENICILLANIC ACIDS

[75] Inventor: Robert L. Rosati, Stonington, Conn.

[73] Assignee: Pfizer Inc., New York, N.Y.

[22] Filed: Feb. 8, 1973

[21] Appl. No.: 330,751

[52] U.S. Cl............ 260/239.1; 424/271; 260/243 C
[51] Int. Cl.$^2$........................................ C07D 499/44
[58] Field of Search................................. 260/239.1

[56] References Cited
UNITED STATES PATENTS
3,483,188   12/1969   McGregor........................ 260/239.1

Primary Examiner—Nicholas S. Rizzo
Attorney, Agent, or Firm—Connolly and Hutz

[57] ABSTRACT

The malonyl derivatives of 6-(α-aminoacylamido)penicillanic acids, the non-toxic salts and esters thereof, are useful as antibacterial agents, therapeutic agents in animals including man, of particular value against gram-negative bacteria and as animal feed nutritional supplements.

3 Claims, No Drawings

MALONYL DERIVATIVES OF 6-(α-AMINOACYLAMIDO)PENICILLANIC ACIDS

BACKGROUND OF THE INVENTION

A large number of 6-(α-aminoacylamido)penicillanic acids wherein the acyl moiety is alkanoyl or substituted alkanoyl wherein the substituent is an aryl, cycloalkyl or heterocyclic group are disclosed in U.S. Pat. Nos. 2,985,648; 3,007,920; 3,192,198; 3,485,819; 3,342,677; 3,538,083; 3,553,201; British Pat. Nos. 873,049; 903,785; 991,586; 1,033,257 and 1,189,990. Further, 6-[α-substituted amino)acylamido]penicillanic acids are described in U.S. Pat. Nos. 3,198,788; 3,248,387; 3,308,023; 3,325,477; 3,340,252; 3,381,001; 3,433,784; 3,518,253; British Pat. Nos. 891,977; 894,457; 985,688; 1,048,907; 1,051,675; 1,057,697; 1,064,893; 1,066,107; 1,125,339; 1,180,745; 1,210,472; Belgian Pat. No. 593,295 and Japanese Pat. No. 7,116,994. Additionally, 6-(α-ureido acylamido)penicillanic acids are disclosed in U.S. Pat. No. 3,352,857 and German Pat. No. 2,054,772; 6-(α-guanidinoacylamido)penicillanic acids in U.S. Pat. Nos. 3,454,557 and 3,406,185; and a variety of p-quanidinoaroyl-, p-guanidinomethylaroly- and p-guanidinoarylalkanoylamido-penicillanic acids are disclosed in U.S. Pat. No. 3,543,265. British Pat. No. 1,061,335 discloses 6-(D-α-hydrazinocarbonylamino-αphenylacetamido)penicillanic acid, and British Pat. No. 1,053,818 describes esters of 6-(α-oxalamidoacylamido)penicillanic acids.

A wide variety of 6-[α-(3-substituted ureido)acylamido]penicillanic acids and 6-[α-(3-substituted thioureido)acylamido]penicillanic acids are reported in the recent literature. U.S. Pat. Nos. 3,479,339; 3,481,922; Netherlands Pat. Nos. 6,901,646; 6,908,909; and Japanese Pat. No. 7,112,732 describe such compounds wherein the 3-substituent is a carbamoyl group; the compounds being referred to as 6-[α-(3-allophanamido)acylamido]-penicillanic acids. U.S. Pat. No. 3,579,501 discloses 6-[α-(3-guanylureido)acylamido]penicillanic acids; that is, such compounds wherein 3-substituent is a guanyl moiety.

The above described products are active as antibacterial agents against a variety of gram-negative bacteria. However, they are more active in vivo via the intraperitoneal route of administration than the oral route.

SUMMARY OF THE INVENTION

There has now been found a novel series of antibacterial agents; namely, malonyl derivatives of 6-(α-aminoacylamide)penicillanic acids of the formula

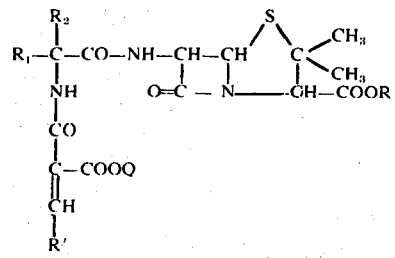

wherein R is selected from the group consisting of hydrogen and acyloxy lower alkyl wherein acyloxy is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl; cations selected from the group consisting of sodium, potassium, calcium, magnesium and ammonium; and amines selected from the group consisting or procaine, N,N'-dibenzylethylenediamine, N-ethylpiperidine, dibenzylamine, N,N-bis(dehydroabietyl)ethylenediamine, 1-ephenamine, triethylamine and benzhydrylamine.

$R_1$ is selected from the group consisting of hydrogen, alkyl of 1 to 14 carbon atoms, cycloalkyl of 3 to 6 carbon atoms, 1,4-cyclohexadienyl, naphthyl, cycloheptatrienyl, benzyl, phenethyl, indolylmethyl, furyl, thienyl, ω-ethylthio(lower alkyl and

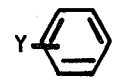

wherein Y is selected from the group consisting of hydrogen, nitro, di(lower alkyl)amino, lower alkanoylamine, lower alkyl, lower alkoxy, hydroxy, sulfamyl, chloro, bromo, fluoro, iodo and trifluoromethyl);

$R_2$ is selected from the group consisting of hydrogen and lower alkyl;

$R_1$ and $R_2$ when taken together with the carbon atom to which they are attached are cycloalkylidene of 3 to 10 carbon atoms;

R' is a member selected from the group consisting of hydrogen, alkyl having from 1 to 4 carbon atoms, cycloalkyl having from 3 to 6 carbon atoms, phenyl, nitrophenyl, naphthyl, pyridyl, anthranyl, furyl, thienyl, indolylmethyl, thiazolyl, pyrimidinyl, pyradizinyl, biphenyl, indazolyl and mono and disubstituted phenyl wherein each substituent is chlorine, bromine, fluorine, alkyl having from 1 to 3 carbon atoms, hydroxy, cyano, amino, trifluoromethyl, acetamido, methoxycarbonyloxy or methoxy; and Q is a member selected from the group consisting of hydrogen, alkyl having from 1 to 4 carbon atoms, naphthyl, quinolyl, phenyl, biphenyl, indanyl or 2-(1,4-naphthoquinonyl); cations selected from the group consisting of sodium, potassium, calcium, magnesium and ammonium; and amines selected from the group consisting of procaine, N,N'-dibenzylethylenediamine, N-ethylpiperidine, dibenzylamine, N,N-bis(dehydroabietyl)ethylenediamine, 1-ephenamine, triethylamine and benzhydrylamine.

Also included within the scope of this invention are the optically active isomeric forms and mixtures thereof which arise by virtue of the asymmetric α-carbon atom of the acyl side chain. These are the D- and the L-diastereoisomers and the DL-form which is a mixture of the two optically-active isomers. The D-form of these compounds is the preferred form because of its greater activity relative to that of the L- or the DL-forms.

Other isomers of the herein described compounds in addition to those arising from the asymmetric α-carbon of the acyl side chain are, of course, possible because of the presence of asymmetric carbon atoms in the 6-aminopenicillanic acid nucleus.

The novel antibacterial products of this invention are of value as additives to materials such as fuels and cutting oils which are subject to bacterial deterioration and are useful in soaps and shampoos and in topical compositions for treatment of wounds. They are also remarkably effective in treating a number of infections caused by susceptible gram-negative and gram-positive bacteria in poultry and animals, including man.

DETAILED DESCRIPTION OF THE INVENTION

The novel and valuable compounds of this invention are prepared by reacting an appropriate 6-($\alpha$-aminoacyclamido)penicillanic acid, or a suitable ester thereof, of the formula

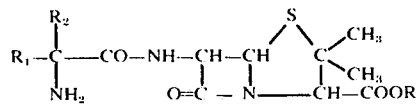

with a carboxy group or a reactive functional derivative of a carboxy group of an appropriate malonic acid derivative of the formula

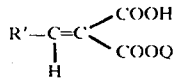

wherein the variables $R_1$, $R_2$, R, R' and Q are as defined above.

The terms "lower alkyl, lower alkoxy and lower alkanoyloxy" as used herein are intended to include those alkyl, alkoxy and alkanoyloxy groups having from one to four carbon atoms.

Suitable esters of the formula II reactants are those wherein R is acyloxy lower alkyl as defined above and those wherein R is a group which can readily be removed as, for example, by catalytic hydrogenation (benzyl, cyanomethyl, phenacyl, allyl and diphenylmethyl).

Suitable reactive functional derivatives of acids of formula III are the acid chlorides or bromides. The acid reactant can be reacted with a "condensing" agent such as a carbonylditriazole and hexahalocyclotriphatriazine to give a reactive intermediate which is coupled to the 6-($\alpha$-aminoacylamido)penicillanic acid. Additionally, the appropriate acid azide or an active ester or thio ester of the formula III reactant with, for example, N-hydroxyphthalimide, N-hydroxysuccinimide, a phenol or thiophenol can be used as acylating agent.

The preferred acylation process of this invention comprises the appropriate 6-($\alpha$-aminoacylamido)-penicillanic acid compound (formula II) with the acid form of a formula II reactant in the presence of a carbodiimide for reasons of convenience, availability or reactants and overall yield or product.

The 6-($\alpha$-aminoacylamido)penicillanic acid reactant can be used in a variety of forms. It can, for example, be used as the free acid or as an alkali metal or amide salt thereof. The use of a salt form of the penicillanic acid reactant is frequently of advantage since the solubility can be manipulated by judicious choice of the salt to permit the use of aqueous or non-aqueous systems. Alkali metal salts are valuable for use in aqueous systems. In non-aqueous systems, an amine salt such as a tertiary lower alkylamine salt, e.g., thriethylamine, or an N-alkyl piperidine salt is generally used. Alternatively, an ester of the 6-($\alpha$-aminoacylamido)penicillanic acid is used, especially in non-aqueous systems. In those instances wherein the final product (formula I) is desired in the form of an ester (R is other than hydrogen), it is obvious and practical to use that ester form of the penicillanic acid reactant.

The acylation process is conducted in a reaction-inert solvent system which can be aqueous or non-aqueous. Aqueous or non-aqueous solvent systems can be used when a carbodiimide is the condensing agent. When using a carbodiimide in an aqueous system, the pH is desirably adjusted to the range of about 5 to about 8, and preferably to about 6 to 7. In a typical procedure, the formula III reactant and carbodiimide are mixed in equimolar proportions in a suitable solvent (tetrahydrofuran, dioxan) and a water-miscible organic solvent solution (water plus dioxan or tetrahydrofuran) containing the 6-($\alpha$-aminoacylamido)-penicillanic acid is added at room temperature and the mixture stirred for several hours until reaction is complete. Temperatures of from about $-5°$ to 30°C. are generally used. In most instances, an excess up to about 10% of the condensing agent is used. The penicillin product is recovered by methods known to the art.

Acylation with an acid halide can also be conducted in aqueous or non-aqueous solvent systems. In aqueous systems, the reaction is generally carried out at pH of from about 6 to about 9 and a temperature of from about 0°C. to about 50°C. It can also be performed in unstable emulsions of water and a water-immiscible organic solvent such as methyl isobutyl ketone and lower alkyl acetates over the pH range of from about 2 to about 4.

In addition to the above purely chemical techniques of acylation, a sonochemical technique, that is, the application of vibrations of ultrasonic frequency (35,000 to 90,000 cycles per second), as described in U.S. Pat. No. 3,079,314, issued Feb. 26, 1963, can also be used to achieve acylation of the 6-[($\alpha$-amino substituted) acylamido]penicillanic acid, especially acylation with an acid halide. Acylation under such conditions is rapid and permissive of a wide range of reaction media, aqueous and non-aqueous alike, homogeneous and non-homogeneous, including emulsified systems.

The acyloxy (lower alkyl) esters of formula I compounds are prepared by the above described acylation procedures but using the appropriate acyloxy (lower alkyl) ester of the appropriate 6-($\alpha$-aminoacylamido)-penicillanic acid in place of the non-esterified 6-($\alpha$-aminoacylamido)penicillanic acid. The acyloxy (lower alkyl) esters of the 6-($\alpha$-aminoacylamido)penicillanic acids are prepared according to methods described in Belgian Pat. No. 721,515 and by Daehne et al., *J. Med. Chem.* 13, 607–612 (1970).

The acyloxy (lower alkyl) halides are synthesized from the corresponding acid chlorides and aldehydes or ketones in accordance with the general procedures of Ulich et al., *J. Am. Chem. Soc*, 43, 660 (1921) and Euranto et al., *Acta. Chem. Scand.* 20, 1273 (1966). The formation of esters from acid salts and alkyl helides is well documented in the chemical literature (Zook and Wagner, "Synthetic Organic Chemistry," John Wiley and Sons, Inc., New York, 1956, p. 484).

The substituted malonic acid reactants of the formula

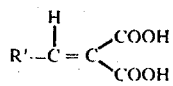

are prepared by the general methods described in *Proc, Indian Acad. Sci.* 14A, 112–22 (1941) and 22A, 400–4 (1945). An appropriate aldehyde is mixed with malonic acid and heated at steam bath temperature for about 4 to 6 hours. The crystalline condensation product may be recrystallized from an organic solvent such as acetonitrile. Representative compounds prepared are as follows:

| R' | M.P. °C. (decomp.) | % Yield |
|---|---|---|
| phenyl | 170 | 11 |
| 4-hydroxyphenyl | 205 | 5 |
| 3,4-dichlorophenyl | 190 | 37 |
| 4-methylphenyl | 154 | 18 |
| 4-chlorophenyl | 200 | 42 |
| 3,5-dichlorophenyl | 207 | 41 |
| 4-bromophenyl | 204 | 66 |
| 2-chlorophenyl | 195 | 45 |
| 4-acetamidophenyl | 243 | 23 |
| 4-nitrophenyl | 230 | 40 |
| 2-methylphenyl | 201 | 10 |
| 3-bromophenyl | 196 | 16 |
| 4-cyanophenyl | 196 | 54 |
| 2-fluorophenyl | 165 | 8 |
| 3-methylphenyl | 180 | 17 |
| 3-methoxyphenyl | 145 | 39 |
| 4-hydroxy,3-methoxyphenyl | 205 | 10 |
| 3,4-dimethoxyphenyl | 200 | 35 |
| 4-trifluoromethylphenyl | 182 | 20 |
| 3-trifluoromethylphenyl | 185 | 50 |
| 2-trifluoromethylphenyl | 171 | 16 |
| 4-methoxycarbonyloxyphenyl | 196 | 48 |
| 9-anthranyl | 100 | 15 |
| 1-naphthyl | 210 | 34 |
| 2-naphthyl | 196 | 15 |

The mono-esters of these compounds are similarly prepared by condensing an appropriate aldehyde with a mono-ester of malonic acid. The mono-esters of malonic acid may be prepared from commercially availble di-esters or di-esters prepared by the action of desired alcohol and a mineral acid on sodium cyanoacetate. The di-ester is partially saponified to yield the mono-ester. The mono-esters may also be prepared by reacting malonic acid with thionyl chloride to yield the mono-acid chloride which is then contacted with the desired alcohol.

In the formulae accompanying the preparation of these new penicillins, "—APA—" represents the moiety

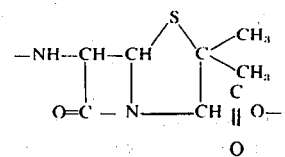

The novel penicillins described herein exhibit in vitro activity against a wide variety of both gram-positive and gram-negative bacteria. Their useful activity can readily be demonstrated by in vitro tests against various organisms in a brain-heart infusion medium by the usual two-fold serial dilution technique. The in vitro activity of the herein-described compounds renders them useful for topical application in the form of ointments, creams and the like, or for sterilization purposes, e.g., sick room utensils.

The in vitro spectra of a number of these compounds are presented in Table I below. 6-α-D-Aminobenzylpenicillin is included for the purpose of comparison. The compounds of Table I have the formula

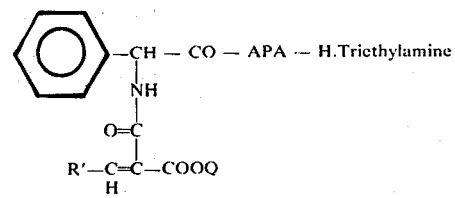

TABLE I.

In Vitro Spectra of Malonamido Acyl Derivatives of α-D-Aminobenzylpenicillin Against Certain Gram-negative Organisms (MIC's)

| R' | E.coli 266 | Ps. aeruginosa 490 | P. mirabilis CO 15 | Q |
|---|---|---|---|---|
| 3,4-dichlorophenyl | 25 | 1.56 | 12.5 | ethyl |
| 3,4-dichlorophenyl | 50 | 25 | 25 | 5'-indanyl |
| 4-acetamidophenyl | 12.5 | 3.12 | 1.56 | 5'-indanyl |
| 4-biphenyl | 6.25 | 0.78 | 3.12 | H.TEA* |
| 3,5-dimethoxyphenyl | 3.12 | 0.78 | 0.78 | H.TEA |
| 2,6-dichlorophenyl | 6.25 | < 0.39 | 0.78 | H.TEA |
| 2-trifluoromethylphenyl | 12.5 | 3.12 | 3.12 | H.TEA |
| 4-fluorophenyl | 3.12 | 0.78 | < 0.39 | H.TEA |
| 2-fluorophenyl | 12.5 | 0.78 | 1.56 | H.TEA |
| 4-methylphenyl | 1.56 | 0.78 | < 0.39 | H.TEA |
| 4-methoxycarbonyloxyphenyl | 6.25 | 1.56 | 0.78 | H.TEA |
| 3,4-dimethoxyphenyl | 6.25 | 1.56 | 0.78 | H.TEA |
| 4-chlorophenyl | 3.12 | 1.56 | 0.78 | H.TEA |
| 9-anthranyl | 50 | 6.25 | 6.25 | H.TEA |
| 3-fluorophenyl | 3.12 | 0.78 | 1.56 | H.TEA |
| 4-trifluoromethylphenyl | 6.25 | 1.56 | 3.12 | H.TEA |
| 3-trifluoromethylphenyl | 3.12 | 0.78 | 1.56 | H.TEA |
| 4-methylphenyl | 1.56 | 0.78 | < 0.39 | H.TEA |
| 4-cyanophenyl | 25 | 3.12 | 50 | H.TEA |
| 1-naphthyl | 3.12 | 0.78 | 1.56 | H.TEA |
| 2-naphthyl | 1.56 | 0.78 | 0.78 | H.TEA |
| 3-methoxyphenyl | 6.25 | 1.56 | < 0.39 | H.TEA |
| 3-methylphenyl | 3.12 | 0.78 | < 0.39 | H.TEA |
| 4-bromophenyl | 6.25 | 0.78 | 0.78 | H.TEA |
| 4-nitrophenyl | 3.12 | 0.78 | 0.78 | H.TEA |
| 4-aminophenyl | 25 | 3.12 | 3.12 | H.TEA |
| 3,5-dichlorophenyl | 1.56 | < 0.39 | 1.56 | H.TEA |
| 2-thienyl | 12.5 | 1.56 | 6.25 | H.TEA |

(MIC's)-continued

| R' | E.coli 266 | Ps. aeruginosa 490 | P. mirabilis CO 15 | Q |
|---|---|---|---|---|
| 4-hydroxyphenyl | 25 | 6.25 | 12.5 | H.TEA |
| phenyl | 3.12 | 0.78 | < 0.39 | H.TEA |
| 2-methylphenyl | 3.12 | 0.78 | < 0.39 | H.TEA |
| 3-bromophenyl | 3.12 | < 0.39 | < 0.39 | H.TEA |
| 2-chlorophenyl | 12.5 | 0.78 | 0.78 | H.TEA |
| α-D-aminobenzylpenicillin | 3.12 | 0.78 | 1.56 | |

*TEA = triethylamine

Additionally, the compounds of this invention are active versus Gram-positive and Gram-negative bacteria in vivo via the parenteral route of administration in animals, including man. Their in vivo activity in animals, including man, by the oral route of administration is more limited as regards susceptible organisms. Nevertheless, oral in vivo activity against *Escherichia coli* and *Staphylococcus aureus* is a common property of many compounds of this invention. Table II below presents the percent protection provided by a number of compounds of this invention against experimental injections in mice.

The compounds of Table II have the formula:

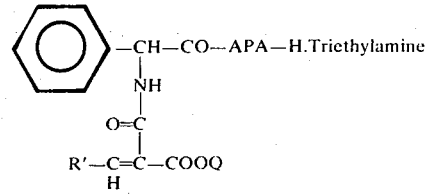

TABLE II.

In Vivo Spectrum of Malonamido Acyl Derivatives of α-D-Aminobenzyl-penicillin. % Protection (mg/kg) in Acute Systemic Infections in Mice.

| R' | Organism | Route* Dose (mg/kg) | % Protection | Q |
|---|---|---|---|---|
| 3,4-dichlorophenyl | E. coli 266 | 200 (PO) | 20 | ethyl |
| | E. coli 266 | 50 (SC) | 20 | |
| | Ps. aeruginosa 104 | 400 (SC) | 0 | |
| 4-acetamidophenyl | E. coli 266 | 200 (PO) | 40 | 5'-indanyl |
| | E. coli 266 | 50 (SC) | 20 | |
| | Ps. aeruginosa | 400 (SC) | 0 | |
| 2-trifluoromethylphenyl | E. coli 266 | 200 (PO) | 40 | H.TEA |
| | E. coli 266 | 50 (SC) | 20 | |
| | Ps. aeruginosa 104 | 400 (SC) | 20 | |
| 4-fluorophenyl | E. coli 266 | 200 (PO) | 40 | H.TEA |
| | E. coli 266 | 50 (SC) | 80 | |
| | Ps. aeruginosa 104 | 400 (SC) | 30 | |
| 2-fluorophenyl | E. coli 266 | 200 (PO) | 40 | H.TEA |
| | E. coli 266 | 50 (SC) | 60 | |
| | Ps. aeruginosa 104 | 400 (SC) | 20 | |
| 2-thienyl | E. coli 266 | 200 (PO) | 60 | H.TEA |
| | E. coli 266 | 50 (SC) | 40 | |
| | Ps. aeruginosa 104 | 400 (SC) | 70 | |
| 1-naphthyl | E. coli 266 | 200 (PO) | 60 | H.TEA |
| | E. coli 266 | 50 (SC) | 40 | |
| | Ps. aeruginosa 104 | 400 (SC) | 0 | |
| 4-cyanophenyl | E. coli 266 | 200 (PO) | 0 | H.TEA |
| | E. coli 266 | 50 (SC) | 40 | |
| | Ps. aeruginosa 104 | 400 (SC) | 70 | |
| 4-acetamido | E. coli 266 | 200 (PO) | 20 | H.TEA |
| | E. coli 266 | 50 (SC) | 0 | |
| | Ps. aeruginosa 104 | 400 (SC) | 60 | |
| 4-methylphenyl | E. coli 266 | 200 (PO) | 20 | H.TEA |
| | E. coli 266 | 50 (SC) | 40 | |
| | Ps. aeruginosa 104 | 400 (SC) | 40 | |
| 4-biphenyl | E. coli 266 | 200 (PO) | 20 | H.TEA |
| | E. coli 266 | 50 (SC) | 40 | |
| | Ps. aeruginosa 104 | 400 (SC) | 0 | |
| 3,5-dimethoxyphenyl | E. coli 266 | 200 (PO) | 60 | H.TEA |
| | E. coli 266 | 50 (SC) | 40 | |
| | Ps. aeruginosa 104 | 400 (SC) | 20 | |
| 2,6-dichlorophenyl | E. coli 266 | 200 (PO) | 20 | H.TEA |
| | E. coli 266 | 50 (SC) | 40 | |
| | Ps. aeruginosa 104 | 400 (SC) | 0 | |
| 3,4-dimethoxyphenyl | E. coli 266 | 200 (PO) | 20 | H.TEA |
| | E. coli 266 | 50 (SC) | 40 | |
| | Ps. aeruginosa 104 | 400 (SC) | 10 | |
| 4-chlorophenyl | E. coli 266 | 200 (PO) | 20 | H.TEA |
| | E. coli 266 | 50 (SC) | 40 | |
| | Ps. aeruginosa 104 | 400 (SC) | 0 | |
| 4-hydroxy-3-methoxy | E. coli 266 | 200 (PO) | 20 | H.TEA |
| | E. coli 266 | 50 (SC) | 60 | |
| | Ps. aeruginosa 104 | 400 (SC) | 0 | |
| 9-anthranyl | E. coli 266 | 200 (PO) | 20 | H.TEA |
| | E. coli 266 | 50 (SC) | 20 | |
| | Ps. aeruginosa 104 | 400 (SC) | 0 | |
| 3-fluorophenyl | E. coli 266 | 200 (PO) | 20 | H.TEA |
| | E. coli 255 | 50 (SC) | 40 | |
| | Ps. aeruginosa 104 | 400 (SC) | 0 | |

-continued

| R' | Organism | Route* Dose (mg/kg) | % Protection | Q |
|---|---|---|---|---|
| 4-trifluoromethylphenyl | E. coli 266 | 200 (PO) | 40 | H.TFA |
|  | E. coli 266 | 50 (SC) | 80 |  |
|  | Ps. aeruginosa 104 | 400 (SC) | 10 |  |
| 3-trifluoromethylphenyl | E. coli 266 | 200 (PO) | 20 | H.TFA |
|  | E. coli 266 | 50 (SC) | 40 |  |
|  | Ps. aeruginosa 104 | 400 (SC) | 0 |  |

* PO = oral
SC = subcutaneous

The acute system infections in mice were produced by the intraperitoneal inoculation of standardized cultures suspended in 5% hog gastric mucin. Treatment with the drugs was initiated 0.5 hours after inoculation of the infecting organism. A second dose was administered four hours later. The percent protection was determined after a hold period of four days.

The oral and parenteral dosage levels in humans and animals for the herein described compounds are, in general, on the order of from 25–200 mg/kg of body weight per day and from about 10–100 mg/kg of body weight per day, respectively. For topical application, the dosage level is on the order of from about 10 to 200 mg/kg/day.

When used for the purposes described herein, the valuable products of this invention can be used alone or in admixture with other antibiotics or in combination with a pharmaceutical carrier selected on the basis of the chosen route of administration and standard pharmaceutical practice. For example, they may be administered orally in the form of tablets containing such excipients as starch, milk, sugar, certain types of clay, etc., or in capsules alone or in admixture with the same or equivalent excipients. They may also be administered orally in the form of elixirs or oral suspensions which may contain flavoring or coloring agents, or be injected parenterally, that is, for example, intramuscularly or subcutaneously. For parenteral administration they are best used in the form of a sterile solution or suspension which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, gylcerol, sorbitol, etc.; buffering agents, as well as local anisthetics and inorganic salts to afford desirable pharmacological properties.

Many of the penicillin ester compounds of this invention exhibit improved absorption on oral administration over that produced by the corresponding free acid or alkali metal salt forms. They, therefore, represent convenient and effective dosage forms of the novel penicillins of formula I above.

Further, many of the esters, especially the acyloxy (lower alkyl) esters described herein, although inactive or of relatively low activity against gram-negative organisms per se are, when administered orally to animals, including man, metabolized to the parent acid which has a wide spectrum of activity against grampositive and gram-negative bacteria. They thus serve as sources of the parent compounds since they are biologically converted in vivo to said compounds. The rate of metabolic conversion of such esters to the parent acid occurs at such a rate as to provide an effective and prolonged concentration of the present acid in the animal body. In effect, such esters act as depot sources for the parent acid. Especially useful in this respect are the acyloxy(lower alkyl) esters such as the benzoyloxymethyl-, acetoxymethyl-, acetoxyethyl-, pivaloyloxymethyl- and α-ethylbutyryloxymethyl esters.

Also useful in this respect are the esters of Formula I where Q is ethyl or 5'-indanyl.

Additionally useful compounds are analogous derivatives of 7-aminocephalosporanic acid, desacetoxy 7-aminocephalosporanic acid, desacetyl 7-aminocephalosporanic acid and tertiary amine derivatives of 7aminocephalosporanic acid wherein the 3-acetoxy group is displaced by a tertiary amine function as antibacterial agents against both gram-positive and gram-negative bacteria. They are prepared by acylation of the appropriate 7-[(α-amino-substituted)acylamido]-cephalosporanic acid compounds of formula IV below with a reactive functional derivative of an appropriate substituted malonic acid of formula III according to methods described herein.

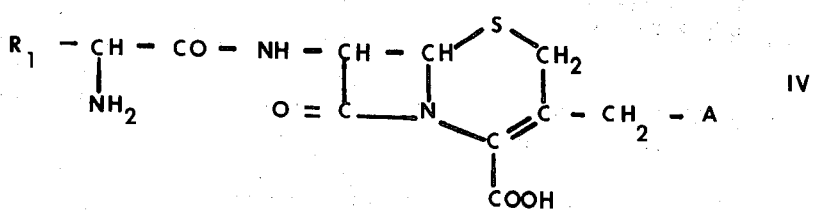

IV

In formula IV $R_1$ is as defined above and A is selected from the group consisting of hydrogen, hydroxy, acetoxy and tertiary amino. Respresentative of the tertiary amino groups which displace the acetoxy moiety ae pyridine, imidazole, benzimidazole, pyrimidine and substituted derivatives of these amines and tri(alkyl)a- mines (especially those wherein the alkyl group contains from one to six carbon atoms). Additionally, other amines and other nucleophiles such as sulfur compounds (e.g., thiourea, xanthates, dithiocarbamates, mercaptoimidazole, alkyl and aryl mercaptans), and carbon nucleophiles (e.g., indole, N-methyl-indole, resorcinol) also displace the 3-acetoxy group to afford compounds of formula V wherein A represents the nucleophilic agent to afford effective broad-spectrum antibacterial agents. Compounds of formula V, or methods for their preparation, are described in the literature;

U.S. Pat. Nos. 3,560,489; 3,575,969; French Pat. No. 2,032,408; J. Antibiot. Ser. A 19 (6) 243–9 (1966); Cocker et al., *J. Chem. Soc.*, 5015–5031 (1969).

EXAMPLE I

4-Chlorobenzylidene Malonic Acid p-Chlorobenzaldehyde (0.100 mole) is mixed with malonic acid (0.100 mole) and heated at steam bath temperature for about 4 hours. After cooling to room temperature, the crude crystalline condensation product is recrystallized from acetonitrile, m.p. 42°C. (decomp).

6-[D-2-Phenyl-2-(4-Chlorobenzylidenemalonamido)Acetamido]Penicillanic acid·Ditriethylamine 4-Chlorobenzylidene malonic acid (0.005 mole) in 20 ml. of water is cooled to 0°C. and the pH adjusted to 6.0 to give a clear solution. To this solution is added 6-α-aminobenzylpenicillin (0.005 mole) and 0.005 mole of 1-ethyl-3-(3-dimethylaminopropyl)-carbodiimide hydrochloride (Ott Chemical Co.). The solution is stirred for about 30 minutes at 0°C., maintaining the pH at about 6.0 with 6 N HCl. Stirring is continued for about 3 hours at room temperature, keeping the ph at about 6.0. The solution is then adjusted to pH 7.7 with saturated sodium bicarbonate solution, andextracted with several portions of ethyl acetate. The aqueous phase is overlayed with ethyl acetate and the pH adjusted to 2.7 with 6 N HCl. The separated ethyl acetate layer is washed once with water and once with saturated sodium chloride solution. To the ethyl acetate extract, dried over anhydrous sodium sulfate, is added 0.01 mole of triethylamine. The solution is taken to dryness under vacuum. The remaining ethyl acetate and triethylamine are removed from the white solid azeotropically under vacuum with several portions of methylene chloride, yield — 42%.

EXAMPLE II

4-Methoxycarbonyloxybenzylidene Malonic Acid 0.55 Mole of p-methoxycarbonyloxybenzaldehyde (Eastman) is mixed with 0.055 mole of malonic acid (Aldrich) and heated at steam bath temperature for about 4 hours. After cooling to room temperature, the crude solid is recrystallized from acetonitrile to yield yellow crystals, m.p. 194°–196°C. (decomp.), yield — 48%.

6-[D-2-Phenyl-2-(4-Methoxycarbonyloxybenzylidenemalonamido)Acetamido] Penicillanic Acid·Ditriethylamine 4-Methoxycarbonyloxybenzylidene malonic acid is reacted with α-aminobenzylpenicillin by the method of Example I to yield the substituted malonyl derivative of 6-α-D-aminobenzylpenicillin, yield — 48 %.

EXAMPLE III

6-[D-2-Phenyl-2-(3,5-Dichlorobenzylidenemalonamido)Acetamido]-Penicillanic acid·Ditriethylamine 3,5-Dichlorobenzylidene malonic acid (1.3 g., 0.005 mole) in 20 ml. of water is cooled to 0°C. and the pH adjusted to 6.0 to give a clear solution. To this solution is added 2.0 g. (0.005 mole) of 6-α-D-aminobenzylpenicillin. After the addition of 960 mg. (0.005 mole) of 1-ethyl-3-(3-dimethylaminopropyl)carbodiimide hydrochloride (Ott Chemical Co.), the solution is stirred for about 30 minutes at 0°C., maintaining the pH at about 6.0 with 6 N HCl Stirring is continued for about 3 hours at room temperature, keeping the ph at about 6.0. The solution is then adjusted to pH 7.7 with saturated sodium bicarbonate solution, and extracted with several portion of ethyl acetate. The aqueous phase is overlayed with ethyl acetate and the pH adjusted to 2.7 with 6 N HCl The separated ethyl acetate layer is washed once with water and once with saturated sodium chloride solution. To the ethyl acetate extract, dried over sodium sulfate, is added 1.01 g. (0.01 mole) of triethylamine. The solution is taken to dryness under vacuum. The remaining ethyl acetate and triethylamine are azeotropically removed under vacuum with 3 portions of methylene chloride. The white solid is dried under high vacuum, yield — 41%.

Repetition of this procedure but replacing 6-α-aminobenzylpenicillin with equimolar amounts of the appropriate acyloxyalkyl ester produces compounds of the formula

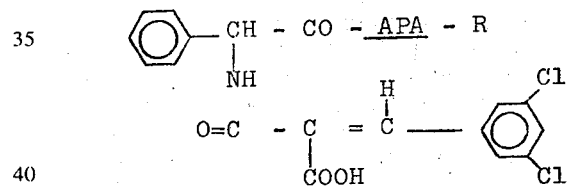

wherein R is
—CH$_2$—O—CO—CH(C$_2$H$_5$)$_2$
—CH$_2$13 O—CO—C$_3$H$_7$
—CH(CH$_3$)—O—CO—CH$_3$
—CH$_2$—O—CO—C$_6$H$_5$
—CH$_2$—O—CO—(4—ClC$_6$H$_5$)
—CH$_2$—O—CO—(2CH$_3$C$_6$H$_4$)
—CH(C$_2$H$_5$)—O—CO—C$_6$H$_5$
—CH$_2$—O—CO—[4-(n-C$_4$H$_9$)C$_6$H$_4$]
—CH$_2$—O—CO—(3-BrC$_6$H$_4$)
—CH$_2$—O—CO—(2-CF$_3$C$_6$H$_4$)
—CH$_2$—O—CO—(2-CH$_3$OC$_6$H$_4$)
—CH$_2$—O—CO—(3-FC$_6$H$_4$)
—CH$_2$—O—CO—C—(CH$_3$)$_3$

EXAMPLE IV

6-[D-2-Phenyl-2-(3-Trifluoromethylbenzylidenemalonamido)Acetamido]Penicillanic Acid·Ditriethylamine 3-Trifluoromethylbenzylidene malonic acid (0.005 mole) in 30 ml. of water is cooled to 0°C. and the pH adjusted to give a clear solution. To this solution is added 0.005 mole of 6-α-aminobenzylpenicillin. After the addition of 0.005 mole of 1-ethyl-3-(3-dimethylaminopropyl)carbodiimide hydrochloride, the solution is stirred for 30 minutes at 0°C., maintaining the pH at 6.0 with 6 N HCl. The solution is stirred an additional 4 hours at room temperature, maintaining the pH at 6.0 with 6 N HCl. The solution is then adjusted to pH 7.7 with saturated sodium bicarbonate solution, and extracted with several portions of ethyl acetate. The aqueous phase is overlayed with ethyl acetate and the pH adjusted to 2.7 with 6 N HCl. To the ethyl acetate extract, dried over sodium sulfate, is added 0.01 mole of triethylamine. The white solid remaining after removal of the solvent under vacuum is azeotropically treated with several portions of methylene chloride to remove residual moisture, yield — 50%.

Repetition of this procedure but replacing 3-trifluoromethylbenzylidene malonic acid with 4-trifluoromethylbenzylidene malonic acid and 2-trifluoromethylbenzylidene malonic acid yields the corresponding derivatives of 6-α-animobenzylpenicillin.

EXAMPLE V

The method of Example I is repeated using the appropriate α-animoacylpenicillin and the appropriate malonic acid derivative of the formula

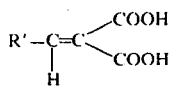

to provide a penicillin of the formula

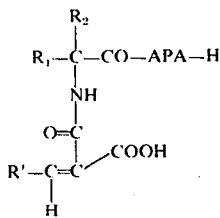

| $R_1$ | $R_2$ | R' |
|---|---|---|
| $C_6H_5$ | H | 3,4-dichlorophenyl |
| $C_6H_5$ | H | phenyl |
| $C_6H_5$ | H | 3-bromophenyl |
| $C_6H_5$ | H | 4-aminophenyl |
| $C_6H_5$ | H | 3-methoxy-4-hydroxyphenyl |
| $C_6H_5$ | H | 4-fluorophenyl |
| $C_6H_5$ | H | 4-methoxycarbonyloxyphenyl |
| $C_6H_5$ | H | 3-fluorophenyl |
| $C_6H_5$ | H | 2-fluorophenyl |
| $C_6H_5$ | H | 3,4-dimethoxyphenyl |
| $C_6H_5$ | H | 4-chlorophenyl |
| $C_6H_5$ | H | 3-chlorophenyl |
| $C_6H_5$ | H | 2-chlorophenyl |
| $C_6H_5$ | H | 4-hydroxyphenyl |
| $C_6H_5$ | H | 3,5-dimethoxyphenyl |
| $C_6H_5$ | H | 4-nitrophenyl |
| $C_6H_5$ | H | 4-biphenyl |
| $C_6H_5$ | H | carboxamidophenyl |
| $C_6H_5$ | H | indolylmethyl |
| H | H | hydrogen |
| 3—indolylmethyl | H | 2-nitrophenyl |
| 3—$FC_6H_4$ | H | 4-cyanophenyl |
| n—$C_6H_{13}$ | H | 3-cyanophenyl |
| $CH_3S(CH_2)_3$ | H | 2-cyanophenyl |
| $C_2H_5S(CH_2)_2$ | H | 4-bromophenyl |
| $CH_3CONHC_6H_4$ | H | 2-bromophenyl |
| 4—$CH_3OC_6H_4$ | H | 4-acetamidophenyl |
| 4—n—$C_3H_9OC_6H_4$ | H | 4-methylphenyl |
| 4—$(C_2H_5)_2NC_6H_4$ | H | 3-methylphenyl |
| $CH_3$ | H | 2-methylphenyl |
| $C_6H_5$ | H | 1-naphthalyl |
| $C_6H_5$ | H | 2-naphthalyl |
| $C_6H_5$ | H | 9-anthranyl |
| $C_6H_5$ | H | 2-thienyl |
| $C_6H_5$ | H | cyclopropyl |
| $C_6H_5$ | H | cyclohexyl |
| $C_6H_5$ | H | 2-furyl |
| $C_6H_5$ | H | 2-pyridyl |

—Continued

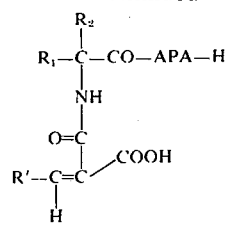

| $R_1$ | $R_2$ | R' |
|---|---|---|
| $C_6H_5$ | H | 2-thiazolyl |
| $C_6H_5$ | H | 2-pyrimidinyl |
| $C_6H_5$ | H | 3-pyridazinyl |
| $C_6H_5$ | H | 7-indazolyl |
| $C_6H_5$ | H | 3-indolyl |
| $C_6H_5$ | H | methyl |
| $C_6H_5$ | H | butyl |
| $C_6H_5$ | H | 4-propylphenyl |
| $C_6H_5$ | H | hydrogen |
| $C_6H_5$ | H | 2,6-dichlorophenyl |
| $C_7H_7$ | H | phenyl |
| 3—$BrC_6H_4$ | H | 3,4-dichlorophenyl |
| 4—$IC_6H_4$ | H | 3,4-dimethoxyphenyl |
| 2—$NO_2$—$C_6H_4$ | H | 4-fluorophenyl |
| 4—$CH_3C_6H_4$ | H | 4-hydroxyphenyl |
| 2—$(CH_3)_2NC_6H_4$ | H | 4-aminophenyl |
| 4—$H_2NSO_2C_6H_4$ | H | 4-fluorophenyl |
| 4—t—$C_4H_9C_6H_4$ | H | 4-methylphenyl |
| 2,3,6—$(CH_3)_3C_6H_2$ | H | 2-nitrophenyl |
| $C_6H_{11}$ | H | 2-cyanophenyl |
| $C_3H_5$ | H | 4-acetamidophenyl |
| $C_2H_5$ | $CH_3$ | 3-nitrophenyl |
| $C_5H_{11}$ | H | 2-bromophenyl |
| 1-naphthyl | H | 4-bromophenyl |
| 3-thienyl | H | 4-cyanophenyl |
| 2-thienyl | H | 2-methylphenyl |
| 2-furyl | H | 3,5-dimethoxyphenyl |
| 3-indolyl | H | 2-chlorophenyl |
| $CH_3S(CH_2)_6$ | H | 3-bromophenyl |
| $C_2H_5$ | $C_2H_5$ | 4-nitrophenyl |
| $C_6H_5CH_2CH_2$ | H | 3,4-dichlorophenyl |
| 4—$HOC_6H_4$ | H | phenyl |
| 1,4-cyclohexadienyl | H | 3-bromophenyl |
|  | —$(CH_2)_2$— | 2-cyanophenyl |
|  | —$(CH_2)_3$— | 4-nitrophenyl |
|  | —$(CH_2)_8$— | 4-fluorophenyl |
| cycloheptatrienyl | H | phenyl |

EXAMPLE VI

3,4-Dichlorobenzylidene Ethyl Hydrogen Malonate 3,4-Dichlorobenzaldehyde (0.010 mole) is mixed with 0.010 mole of monoethyl malonate (Organic Syntheses Coll. Vol. IV, p. 417) and heated on the steam bath for 15 hours. The material is suspended in ether and extracted with 2 portions of sodium bicarbonate solution. The separated basic aqueous layer is overlayed with ether and acidified with 6 N HCl. The ether layer is dried over anhydrous sodium sulfate, filtered and taken to dryness under vacuum. The white solid is crystallized from cyclohexane, yield — 32%.

6-[D-2-Phenyl-2-(Ethyl-3,4-Dichlorobenzylidenemalonamido)Acetamido]Penicillanic Acid · Triethylamine 3,4-Dichlorobenzylidene ethyl hydrogen malonic acid (0.003 mole) in 20 ml. of water is cooled to 0°C. and adjusted to pH 6.0 to give a clear solution. To this solution is added 0.003 mole of 6-α-aminobenzylpenicillin and 0.003 mole of 1ethyl-3-(dimethylaminopropyl)carbodiimide · hydrochloride. The reaction mixture, maintained at pH 6.0 with 6 N HCl, is stirred at 0°C. for about 30 minutes, followed by stirring at room temperature for 4 hours. The solution is adjusted to pH 7.7 with saturated sodium bicarbonate solution and extracted with 2 portions of ethyl acetate. The aqueous phase is overlayed with ethyl acetate and adjusted to pH 2.7 with 6 N HCl. The separated ethyl acetate extract is washed once with water and then with saturated sodium chloride solution. To the ethyl acetate extract, dried over anhydrous sodium sulfate, is added 0.003 mole of triethylamine. The solution is taken to dryness under vacuum to yield a white solid. Remaining ethyl acetate and triethylamine are removed by azeotropic treatment with several portions of methylene chloride, yield — 50%.

EXAMPLE VII

Mono-5-Indanyl Malonate

Malonic acid (0.108 mole) in 100 ml. of ether is refluxed for 1 hour with 0.120 mole of thionyl chloride. After cooling to room temperature, 0.108 mole of 5-indanol is added and the yellow solution is refluxed for 2 hours. The reaction solution is cooled to room trmperature and the excess thionyl chloride is removed under vacuum. Ether (50 ml.) is added and the solution is washed twice with 50 ml. portions of water. The ether layer is extracted with two 50 ml. portions of sodium bicarbonate solution and one 25 ml. portion of water. The combined basic aqueous phase is acidified with 6 N HCl and extracted with several portions of ether. The ether extract is dried over anhydrous sodium sulfate, filtered and taken to dryness under vacuum to a viscous yellow which crystallizes on standing, m.p. 51°–54°C., yield — 54%.

3,4-Dichlorobenzylidene 5'-Indanyl Hydrogen Malonate

Mono-5-indanyl malonate (0.010 mole) is mixed with 0.010 mole of 3,4-dichlorobenzalydehyde and heated on a steam bath for about 18 hours. The crystals obtained after cooling the reaction mixture to room temperature are recrystallized from acetonitrile, m.p. 174°–178°C., yield — 33%.

6-[D-2-Phenyl-2-(5'-Indanyl-3,4-Dichlorobenzylidene malonamido)Acetamido]Penicillanic Acid · Triethylamine 3,4-Dichlorobenzylidene 5'-indanyl hydrogen malonate (0.0031 mole) in 30 ml. of water is adjusted to pH 6.0 to give a torbid solution. To this solution is added 0.0031 mole of 6-α-aminobenzylpenicillin and 0.0031 mole of 1-ethyl-3-(3-dimethylaminopropyl)carbodiimide hydrochloride. After stirring for 30 minutes at 0°C., maintaining the pH at 6.0 with 6 N HCl, the solution is stirred for about 3 hours at room temperature. The pH is adjusted to 7.7 with saturated sodium bicarbonate solution and extracted with 2 portions of ethyl acetate. The aqueous phase is overlayed with ethyl acetate and the pH adjusted to 2.7 with 6 N HCl. The separated ethyl acetate extract is washed once with water and once with saturated sodium chloride solution. To the ethyl acetate extrat, dried over anhydrous sodium sulfate, is added 0.0031 mole of triethylamine and the solution taken to dryness under vacuum. Ethyl acetate and triethylamine are removed from the white gum by treating azeotropically with 3 portions of methylene chloride, yield — 20%.

EXAMPLE VIII p-Acetamidobenzylidene 5'-Indanyl Hydrogen Malonate p-Acetamidobenzaldehyde (Eastman) is reacted with mono-5-indanyl malonate by the method of Example V to yield crystals, m.p. 190°–194°C., yield — 16%.

6-[D-2-Phenyl-2-(5'-Indanyl-p-acetamidobenzylidenemalonamido)-Acetamido]Penicillanic Acid · Triethylamine 6-α-D-aminobenzylpenicillin is reacted with p-acetamidebenzylidene 5'-indanyl hydrogen malonate by the method of Example VII.

Repitition of this procedure but replacing p-acetamidobenzylidene 5'-indanyl hydrogen malonate with equimolar amounts of the appropriate malonic acid derivative of the formula

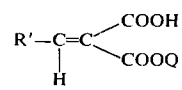

to provide a penicillin of the formula

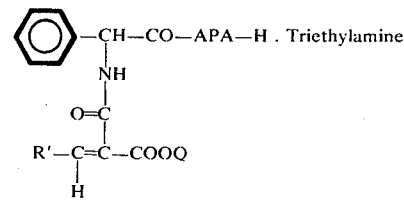

| R' | Q |
| --- | --- |
| 3,4-dichlorophenyl | methyl |
| phenyl | propyl |
| 3-bromophenyl | hexyl |
| 4-aminophenyl | 1-naphthyl |
| 3-methoxy-4-hydroxyphenyl | 6-quinolyl |
| 4-fluorophenyl | phenyl |
| 4-methoxycarbonyloxyphenyl | 2-biphenyl |
| 4-hydroxyphenyl | 3-(2-methyl-4-pyronyl) |
| 4-nitrophenyl | 4-indanyl |
| 3,5-dimethoxyphenyl | 8-quinolyl |
| 2-chlorophenyl | 2-(1,4-naphthoquinonyl) |

EXAMPLE IX

The method of Example VI is repeated replacing 6-α-D-aminobenzylpenicillin with equimolar amounts of the appropriate ester of 6-α-D-aminobenzylpenicillin producing compounds of the formula.

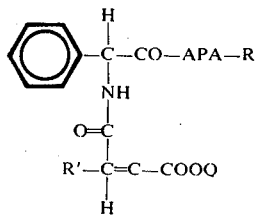

wherein R' and Q are the same as those described in Example VIII, and R is as described in Example III.

EXAMPLE XI

The free mono-acids are transformed to their monosodium, potassium, calcium, magnesium, ammonium, procaine, N,N-dibenzylethylenediamine, N-ethylpiperidine, dibenzylamine, N,N-bis(dehydroabietyl)ethylenediamine, triethylamine and benzhydrylamine salts by reaction of aqueous solutions thereof with one equivalent of the appropriate base. The salts are recovered by taking the solutions to dryness under vacuum.

Similarly, the di-acids are converted to their salts by reaction of aqueous solutions thereof with two equivalents of base, and taking the solutions to dryness under vacuum.

GENERAL PROCEDURE FOR α-AMINOACYLPENICILLIN ACYLOXYALKYL ESTERS

The procedure of Daehne et al., J. Med. Chem. 13, 612 (1970) is employed to prepare the title compounds. The procedure comprises acylating the appropriate acyloxyalkyl 6-aminopenicillanate with the appropriate amino acid chloride hydrochloride in a solvent such as methylene chloride in the presence of an acid acceptor ($NaHCO_3$). The ester, amino acid chloride hydrochloride and $NaHCO_3$ are reacted in a molar proportion of about 1.25:1.0:2.5 at 0°–10°C. for 2 – 3 hours. The mixture is filtered through diatomaceous earth, isopropanol added to the filtrate which is then concentrated in vacuo. Concentration is continued until the produce separates. Isopropanol and ether are added to the mixture to complete precipitation of the product.

What is claimed is:

1. A compound of the formula

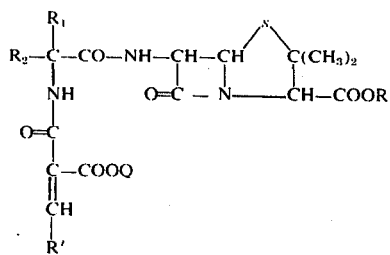

wherein R is selected from the group consisting of hydroen and acyloxy lower alkyl wherein acyloxy is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl, cations selected from the group consisting of sodium, potassium, calcium, magnesium and ammonium; and amines selected from the group consisting of procaine, N,N'-dibenzylethylenediamine, N-ethylpiperidine, dibenzylamine, N,N-bis(dehydroabietyl)ethylenediamine, 1-ephenamine, triethylamine and benzhydrylamine;

$R_1$ is selected from the group consisting of hydrogen, alkyl of from 1 to 14 carbon atoms, cycloalkyl of from 3 to 6 carbon atoms, 1,4-cyclohexadienyl, cyclohepatrienyl, naphthyl, benzyl, phenethyl, indolylmethyl, furyl, thienyl, ω-ethylthio(lower)alkyl and

wherein Y is selected from the group consisting of hydrogen, nitro, di(lower alkyl) amino, lower alkanoylamino, lower alkyl, lower alkoxy, hydroxy, sulfamyl, chloro, bromo, fluoro, iodo and trifluoromethyl;

$R_2$ is selected from the group consisting of hydrogen and lower alkyl;

$R_1$ and $R_2$ when taken together with the carbon atom to which they are attached are cycloalkylidene of 3 to 10 carbon atoms;

R' is a member selected from the group consisting of hydrogen, alkyl having from 1 to 4 carbon atoms and cycloalkyl having from 3 to 6 carbon atoms; and Q is a member selected from the group consisting of hydrogen, alkyl having from 1 to 4 carbon atoms, naphthyl, quinolyl, pphenyl, biphenyl, indanyl, 2-(1,4-naphthoquinonyl); cations selected from the grooup consisting of sodium, potassium, calcium, magnesium and ammonium; and amines selected from the group consisting of procaine, N,N'-dibenzylethylenediamine, N-ethylpiperidine, dibenzylamine, N,N-bis(dehydroabietyl)ethylenediamine, 1-ephenamine, triethylamine and benzhydrylamine.

2. A compound of the formula

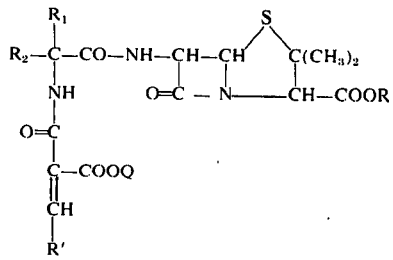

wherein
R is hydrogen;
$R_1$ is benzyl or phenethyl;
$R_2$ is hydrogen or lower alkyl;
R' is hydrogen, alkyl having from 1 to 4 carbon atoms, or cycloalkyl having from 3 to 6 carbon atoms, and
Q is hydrogen or alkyl having from 1 to 4 carbon atoms.

3. 6-[D-2-Phenyl-2-(2'-thienylmalonamido)acetamido]penicillanic acid.

* * * * *